2,826,215

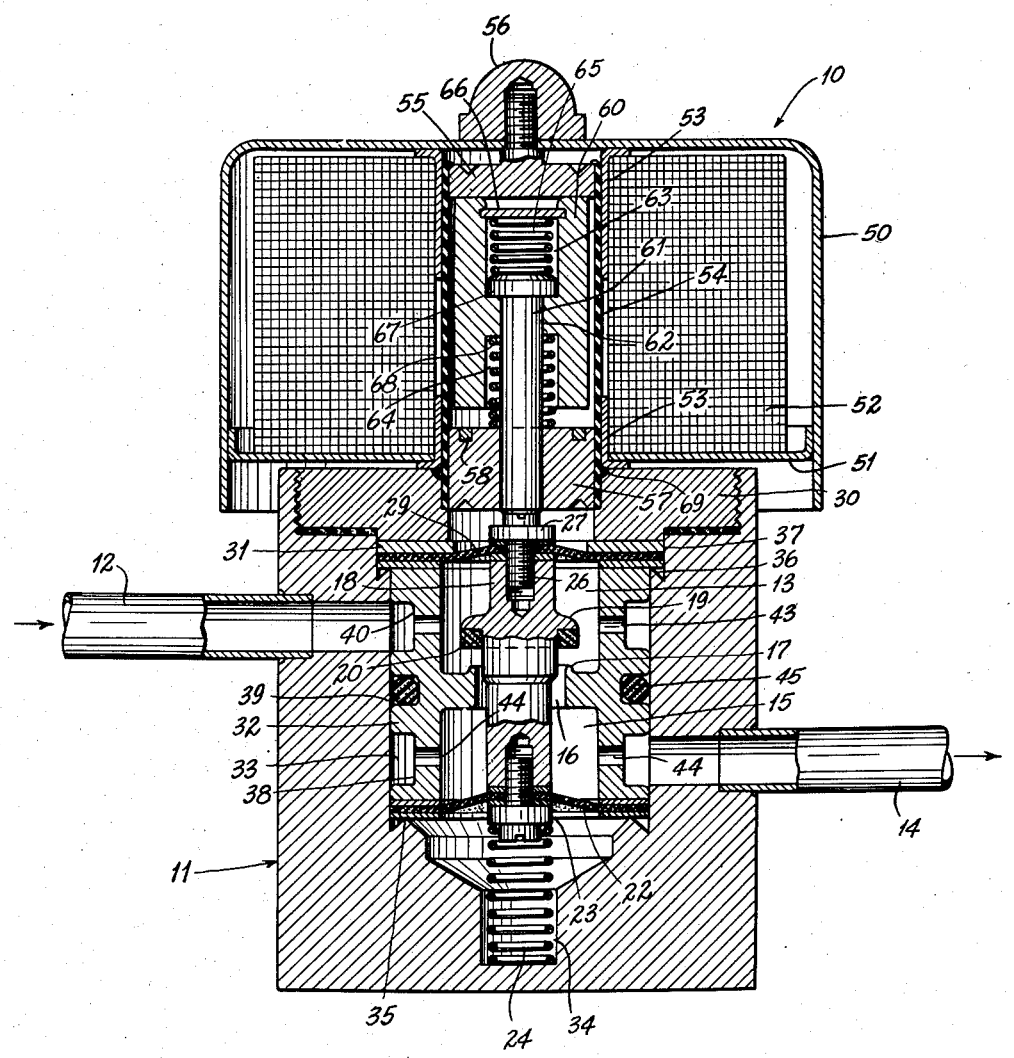
March 11, 1958  J. G. WOLFSLAU ET AL  2,826,215
BALANCED PRESSURE SOLENOID VALVE
Filed April 21, 1954
INVENTORS:
JOSEPH G. WOLFSLAU,
JOHN E. DUBE,
By Kingsland, Rogers & Ezell
ATTORNEYS

United States Patent Office 2,826,215
Patented Mar. 11, 1958

BALANCED PRESSURE SOLENOID VALVE

Joseph G. Wolfslau, St. Louis, and John E. Dube, Chesterfield, Mo., assignors to Alco Valve Company, University City, Mo., a corporation of Missouri Application April 21, 1954, Serial No. 424,676

6 Claims. (Cl. 137—454.6)

This invention relates to improvements in solenoid valves, and in particular is concerned with a balanced pressure solenoid valve in which all of the actuating mechanism is located out of contact with any fluid which is controlled by the valve.

In the past, solenoid valves have been provided which are adapted to control the flow of fluid through a valve, but these have been objected to since the armature and other moving parts have been required to be in contact with the fluid which is controlled. In such valves, the corrosive effects of the fluid cause corrosion and disrepair of the moving parts which result in faulty operation of the valve and increased maintenance problems. In handling certain corrosive chemical fluids and even water, it is necessary to provide proper relationship between the moving parts such that corroding influences will not cause failure of the operating mechanism.

By means of this invention, there has been provided a valve which is actuated by the force from a solenoid in which all of the moving parts of the solenoid construction are sealed off from the fluid flowing to the valve. A balanced pressure system is provided also whereby very small actuating forces from the spring or solenoid cause the effective operation and control of the valve. When speaking of a balanced pressure it is to be understood that the forces created within the valve are designed to aid in the operation of the valve to the position desired and to maintain this position. Strictly speaking a balanced pressure of the fluid forces with the valve itself is not obtained but these forces are combined with spring and armature forces to create a system which approaches a balanced condition that needs only a small overbalancing force to obtain the desired operation. The effective areas of the diaphragms on the inlet and outlet sides of the valve are so designed with respect to the effective port area of the valve that a balance is obtained throughout a wide variation of pressures and pressure differentials between the upper and lower diaphragms so that, upon application of a small spring force or a small force created by energization of the coil, complete control of the valve may be had. As mentioned above, this is accomplished with the complete exclusion of all liquids from the solenoid structure and the spring forces acting therein, so that the moving components and spring forces within the solenoid are completely protected against any corrosive influences.

Accordingly, it is a primary object of this invention to provide a solenoid valve in which the fluid flow to be controlled is completely sealed off from all of the operating components within the solenoid structure.

It is a further object of this invention to provide a solenoid valve having balanced diaphragms on the inlet and outlet sides of the valve which completely enclose the fluid in the valve housing and seal the same from the solenoid structure.

It is yet another object of this invention to provide a solenoid valve having a balanced pressure diaphragm system in which the solenoid valve member is associated with the spring force within the solenoid valve, whereby a small actuating force from the solenoid may properly control the operation of the valve.

It is a still further object of this invention to provide a balanced diaphragm solenoid valve in which the solenoid structure is sealed from the valve and is provided with opposed spring acting forces acting upon the armature of the solenoid valve, which can be constructed with standard parts to provide a rugged apparatus of efficient operation at a minimum cost.

It is still a further object of this invention to provide a balanced diaphragm solenoid valve in which the solenoid structure is sealed from the valve and is provided with a spring force acting upon the armature of the solenoid valve which can be constructed with standard parts to provide a rugged apparatus of efficient operation at a minimum cost.

Yet a further object of this invention is to provide a casing for a balanced pressure valve, which valve may be made in cartridge form so as to provide for ready replacement with ease and correctness of assembly. This is accomplished in such a manner that the valve assembly may be inserted in the casing in only one way and to provide for the use of valve assemblies having different characteristics as may be desired under varying operating conditions.

Further objects of this invention will readily appear to those skilled in the art, and will be evident from the detailed description of a preferred embodiment of this device which follows.

Reference will now be had, for the purpose of illustration of this invention, to the accompanying drawing showing a cross-sectional view through the vertical axis of the solenoid valve of this invention.

The solenoid valve of this invention includes two main assemblies which are the solenoid generally indicated at 10 and the valve housing generally indicated at 11. The valve housing is provided with a fluid inlet 12 opening into an inlet chamber 13 and a fluid outlet 14 which is connected to an outlet chamber 15. The two chambers are interconnected by a valve port 16 which is provided with a raised valve seat 17. A valve rod 18 extends through the inlet and outlet chambers and to the valve port and is provided with a flange-like, outwardly extending valve 19 having an insert 20 of bonded rubber or the like to provide effective sealing when the valve is closed against the valve seat. The lower end of the valve rod 18 is connected to a lower diaphragm 22 by a cap 23. The lower diaphragm is adapted to be secured to the valve housing 11, as will be described below. A return spring 24 bears against the bottom of valve rod 18 to bias it upwardly toward a valve open position.

The valve rod 18 is provided with a threaded opening 26 to receive a threaded cap 27 to hold an upper diaphragm 29 therebetween. The upper diaphragm is held within the valve housing by a retaining member 30 which is threadedly received within the top of the valve housing. This retaining member is tightened against washer-like gasket 31 which has an opening of a lesser diameter than the inlet chamber 13, such that the effective area of the diaphragm 29 is defined by the outer edge of the valve rod 18 and the cap 27 and the gasket 31. In this connection, it will be noted that the effective area of the upper diaphragm is less than that of the lower diaphragm for purposes which will be pointed out below.

The whole valve assembly is adapted to be easily inserted within the valve housing by means of a valve cage construction which provides for ready and efficient assembly. Thus, the valve seat 17 is built into a valve cage 32 which fits within a well-like opening 33 in the housing. This opening communicates with a reduced diameter bottom opening 34 for receiving return spring 24. There are further provided a lower concentric annular beveled edge 35 of lesser diameter than the opening 33, and an upper sharp edge 36 of the same diameter as said opening. The edge 36 is offset from an opening 37 which is of a larger diameter than opening 33 for a reason to appear.

The valve cage includes three annular grooves on its outer periphery, 38, 39 and 40. Both the top and bottom grooves, 40 and 38, respectively, provide for annular flow of fluid from the inlet 12 and to the outlet 14, through a multiplicity of radial passages 43 and 44 communicating with the interior of the valve. This provides for a more even flow distribution of the fluid within the valve structure so that a more efficient pressure regulation is obtained.

The middle groove 39 is provided with an O-ring 45 which serves to seal off and prevent fluid passage directly between the upper and lower grooves 40 and 38.

The valve cage before assembly is connected to the valve rod 18 and the associated upper and lower diaphragms 29 and 22 which are provided with washer-like gaskets. The lower diaphragm and its gaskets are of about the same diameter as opening 33 whereas the upper diaphragm and its gaskets are of about the same diameter as the larger opening 37 so that it is obvious that the assembly may fit into housing in only the proper way shown in the drawing. If the reverse position were attempted, the diaphragm 29 and its gaskets would be blocked by the edge 36.

Once the assembly is inserted into the housing, the gaskets of diaphragms 22 and 29 are forced against edges 35 and 36, respectively, by the closure of retaining member 30 so that, together with O-ring 39, the proper sealing is effected.

The solenoid 10 includes a casing 50 and a plate 51 at the bottom thereof which encloses a solenoid coil 52. Disposed within the solenoid coil are upper and lower sleeves 53 which are of a magnetic material and are designed to distribute the flux from the solenoid coil therebetween. A non-magnetic tube 54 is set interiorly of the sleeves and is closed at the top by a stop member 55 which is welded to the tube. The casing is held in position by a nut 56 threaded to the stop member 55. This stop member is opposed at the bottom of the tube 54 by a magnetic plug 57, which is provided with a bored hole therethrough so as to receive the plunger 61 for reciprocable movement therein. A shading ring 58 is set within the top of the plug so as to counteract the effects of eddy currents and to eliminate noise and chattering from the armature when the solenoid is energized. A magnetic armature 60 is set within the tube 54 and is adapted for reciprocable movement therein. The shank portion of a plunger 61 is guided within the central opening 62 of the armature. The bottom of this plunger abuts against the cap 27 of the valve rod 18 and is caused to be in contact therewith at all times by virtue of the biasing forces of the springs acting thereon, as will appear.

By this arrangement the requirement of exact concentricity between the solenoid chamber and the valve chamber, which would be required if the plunger and valve rod were integral, has been obviated. Disposed on either side of the opening 62 and concentric therewith are enlarged upper and lower recesses 63 and 64, respectively. Within the recess 63 is disposed a helical spring 65 which bears against a plug 66 staked to the upper end of the recess 63 and the head 67 of the plunger. This spring, which shall be termed the overtravel spring, has a force in excess of return spring 24 so that plunger and armature 60 move in unison. This spring force permits the armature 60 to continue its travel to seal against the magnetic plug 57 after the valve member 19 has been seated against the raised valve seat 17. This eliminates noise and chatter from the armature when the solenoid is energized. Within the lower recess 64 of the armature 60 is disposed a helical spring 68 which bears at the top against the armature member and at the bottom against the top of the magnetic plug 57. This spring shall be termed the armature spring.

The solenoid assembly is fixed to the valve housing by welding 69 or the like, at the juncture of the lower sleeve 53, the retaining member 30, and the inner tube 54, although, if desired, this could be accomplished by threading the interior of the retaining member and the exterior of the tube 54 for a threaded fit.

*Operation*

The solenoid valve is shown in the drawing in the non-energized position in which the valve will be normally open. The only parts which will be contacted by the fluid are those which are enclosed within the limits of the upper diaphragm and the lower diaphragm and only these parts need be constructed of a material which is resistant to corrosion caused by the fluid handled. All of the materials involved in the construction of the solenoid 10 above the upper diaphragm 29 may be made of the most convenient and economical materials which are available; and this is, likewise, true of the parts beneath the lower diaphragm 22.

In the position shown in the drawing, the armature spring 68 and return spring 24 offset the balance between the upper diaphragm 29 and the lower diaphragm 22 holding the armature 60 against the stop member 55 and retaining the valve in the open position. Successful operation at various fluid pressures and pressure differentials may be had without disturbing this balance. In this position, the fluid pressure in the inlet chamber 13 acts against the upper diaphragm 29 which is roughly of the same effective area as the effective port area by design. The fluid pressure in the outlet chamber 15 acts against the lower diaphragm 22 which is roughly twice the effective area of the port area by design. This effects a pressure balance across the diaphragm urging the valve assembly to the closed position which is overcome by the small force generated by the armature spring 68 and return spring 24. The force of the armature 60 upon energization of the coil 52 need only be of sufficient value to overcome the force of the armature spring 68 and return spring 24 to effect the downward movement of the armature against the plug member 57 by the overbalance of pressure acting upon the lower diaphragm 22, whereby the valve is closed.

In the reverse operation, when the valve is closed so that the valve member 19 is seated against the valve seat 17, the fluid pressure within the inlet chamber 13 acts against the effective area of the upper diaphragm urging it upwardly while the fluid pressure acting upon the top of the valve member 19 exerts a downward force which is substantially the same as the upward force due to the fact that the effective area of the upper diaphragm is substantially the same as the effective port area. By this means there is maintained a balance which is overcome by the force generated by energization of the coil which closes the valve against the spring forces. When the electrical current to the solenoid is interrupted, the armature is no longer urged downwardly against the stop member. The armature spring 68 and return spring 24 force the armature and plunger upwardly so as to bring the valve to its normally open position.

It will be apparent from the above description that any materials of construction may be used in the manufacture of the valve housing and the associated parts between the two diaphragms in the handling of corrosive fluids. These materials of construction may include stainless steel, cast iron, titanium and other known resistant materials of construction. The other materials used on the exterior of the two diaphragms can be of standard composition which are most easily accessible with due economical and structural considerations. Various modifications and changes in the design of the solenoid valve may be made without departing from the scope of this invention, and it is desired that this invention include obvious changes such as will appear to those skilled in the art.

What is claimed is:

1. In a solenoid valve having a solenoid for controlling the flow of fluid through a valve port, the combination of a valve housing having an inlet and an outlet connected by a valve port, a valve within said housing connected to a valve stem for controlling the flow of fluid through said port, a solenoid associated with said housing and having a first biasing means therein for urging a solenoid armature operatively engaging said valve stem to a position to open said valve, a second biasing means for urging the valve stem to a valve closed position when the armature is operated by energization of the solenoid, pressure means connecting with said inlet and outlet, said pressure means including a first and second diaphragm connected to the valve stem on the inlet and outlet side of the valve, said first diaphragm having an effective area of approximately the effective area of the valve port, and said second diaphragm having an effective area of approximately twice the effective area of said valve port.

2. In a solenoid valve for controlling the flow of fluid through a valve port, the combination comprising a fluid inlet and a fluid outlet, a valve situated therebetween, a first diaphragm in communication with said inlet, a second diaphragm in communication with the outlet, said first diaphragm having an effective area of approximately the effective area of the valve port, said second diaphragm having an effective area approximately twice the effective area of said valve port, and a valve stem connecting said diaphragms and the valve.

3. In a solenoid valve having a solenoid for controlling the flow of fluid through a valve port, the combination comprising a fluid inlet and a fluid outlet, a valve situated therebetween, a first diaphragm in communication with said inlet, a second diaphragm in communication with the outlet, a valve stem connecting said diaphragms and the valve, said valve stem cooperating with means extending into a solenoid, means in said solenoid for operating said valve stem upon energization thereof, said valve and said diaphragms forming a valve assembly and including a valve cage insertable within a valve housing, means for sealing said diaphragms from one another on the exterior of said valve cage within the housing, and means for ensuring proper emplacement of said assembly within said housing.

4. In a solenoid valve having a solenoid for controlling the flow of fluid through a valve port, the combination comprising a fluid inlet and a fluid outlet, a valve situated therebetween, a first diaphragm in communication with said inlet, a second diaphragm in communication with the outlet, a valve stem connecting said diaphragms and the valve, said valve stem cooperating with means extending into a solenoid, means in said solenoid for operating said valve stem upon energization thereof, said valve and said diaphragms forming a valve assembly and including a valve cage insertable within a valve housing, means for sealing said diaphragms from one another on the exterior of said valve cage within the housing, and means for ensuring proper emplacement of said assembly within said housing, said last named means including means on said housing for receiving in correct position only one of said diaphragms.

5. In a valve, the combination comprising a valve housing, a valve assembly removable from said housing, said assembly including a valve cage having a first diaphragm enclosing one end of said cage and a second diaphragm enclosing the other end thereof, and a valve rod having a valve face thereon supported by said diaphragms and movable within said valve cage against a valve seat forming a part of said cage.

6. In a valve, the combination comprising a valve housing, a valve assembly removable from said housing, said assembly including a valve cage having a first diaphragm enclosing one end of said cage and a second diaphragm enclosing the other end thereof, a valve rod having a valve face thereon supported by said diaphragms and movable within said valve cage against a valve seat forming a part of said cage, and means on said valve cage in communication with an inlet and outlet in said housing for passing fluid around the periphery of said valve cage into and out of the interior of said cage in an even flow distribution on opposed sides of said valve.

References Cited in the file of this patent

UNITED STATES PATENTS

| | | |
|---|---|---|
| 1,153,681 | Fulton | Sept. 14, 1915 |
| 1,424,251 | Kelly | Aug. 1, 1922 |
| 2,388,696 | Lacart | Nov. 13, 1945 |
| 2,602,627 | Britton | July 8, 1952 |

FOREIGN PATENTS

| | | |
|---|---|---|
| 491,867 | Canada | Apr. 7, 1953 |